United States Patent [19]

Mungia

[11] Patent Number: 5,344,649
[45] Date of Patent: Sep. 6, 1994

[54] CAT REPELLANT AND DISPENSER

[76] Inventor: Jesse Mungia, P.O. Box 695, Gonzales, La. 70707-0695

[21] Appl. No.: 937,175

[22] Filed: Aug. 31, 1992

[51] Int. Cl.$^5$ .................. A61K 35/78; B67D 5/00
[52] U.S. Cl. ................. 424/195.1; 514/920; D22/120; 222/3
[58] Field of Search ............ 514/920; 424/195.1; 222/3; D22/120

[56] References Cited

U.S. PATENT DOCUMENTS

| | | | |
|---|---|---|---|
| 3,295,246 | 9/1965 | Landsman et al. | 43/131 |
| 3,474,176 | 10/1969 | Freeman | 424/331 |
| 3,755,064 | 8/1973 | Malerson | 161/174 |
| 4,169,898 | 10/1979 | Haase | 424/331 |
| 4,455,304 | 6/1984 | Yaralian | 424/195.1 |
| 4,666,670 | 5/1987 | Cox | 422/124 |
| 4,766,695 | 8/1988 | Harlow | 47/24 |
| 4,775,532 | 10/1988 | Clayton | 424/195.1 |
| 5,022,819 | 6/1991 | Murcin et al. | 416/62 |

*Primary Examiner*—John W. Rollins
*Attorney, Agent, or Firm*—David L. Ray

[57] ABSTRACT

A cat repellant and dispenser therefor for dissipating odors from a cat repellant into the atmosphere surround said dispenser including a housing, a reservoir located in the housing for holding and containing a solid, particulate cat repellant, a chamber located in the housing adjacent to the reservoir for receiving the solid, particulate cat repellant from the reservoir, the chamber having a slot therein for releasing odors emanating from the cat repellant to the atmosphere surrounding the dispenser to repel cats. The cat repellant of the invention is particulate pepper.

10 Claims, 1 Drawing Sheet

CAT REPELLANT AND DISPENSER

BACKGROUND OF THE INVENTION

1. Field of the Invention

The invention relates to animal repellents, and, in particular, to animal repellents. More particularly, the present invention relates to a repellant for cats, and a dispenser therefor.

2. Description of the Related Art

Odorants and dispensers for odorants are known in the art. Some odorants are fragrant, and some are repugnant to certain species of animals and act as repellents to particular species.

It is quite common for cats in cold climates or during the wintertime in temperate climates to seek the warmth of various objects. By the word "cat" is meant the small domestic cat which are commonly kept as pets throughout the world and which prey upon mice when given the opportunity. Frequently, cats will crawl into the area of an automobile surrounding the engine shortly after the engine has been turned off or ceases operation. The engine may retain heat for many hours, and a cat may crawl into the shroud in front of the radiator of an automobile engine seeing warmth. Unfortunately, cats commonly go to sleep on the engine in the vicinity of the radiator and may remain there until the automobile engine is restarted. As the radiator fan blade of the engine begins turning, a cat may receive serious injury from the turning blade, or the cat may be killed. Furthermore, a cat can be caught in the flexible belts driving the alternator, power steering unit, and other equipment of the automobile engine.

Exemplary of animal repellant compositions and dispensers for odorants are the following U.S. Patents:

U.S. Pat. No. 5,022,819 discloses an air fragrance device for a ceiling which is an apparatus wherein a plurality of generally "U" shaped clips are securable to opposed, elongated lateral edges of a ceiling fan blade, and the brackets are securable together by spaced parallel coil springs to maintain the brackets to the ceiling fan blade, and an air freshener packet including a plurality of tubes are spaced apart a predetermined distance equal to a distance spaced apart by the springs received through respective ones of the tubes to secure the tubes and the packet to the ceiling fan blade. A modification of the instant invention includes the "U" shaped brackets securable together by opposed pairs of flexible straps including hook and loop fasteners mounted at terminal ends thereof, and a modified deodorizing packet includes a plurality of polymeric springs securable to spaced apertures of an underside of the packet to position the packet above an upper fan blade surface during securement by the straps of the device.

U.S. Pat. No. 4,775,532 discloses an animal repellant composition including an animal repellent proportion of an olfactory animal repellent carried by a vehicle including a di(alkhyl) adipate and a method of repelling animals.

U.S. Pat. No. 4,766,695 discloses a tree banding article to protect against gypsy moth larvae. The article is disclosed to protect tree foliage from crawling insects such as gypsy moth larvae. The banding article is a flexible polymeric film, such polyethylene film bearing an adhesive or elastomeric material layer on the surface in contact with the tree and a coating on the exterior surface which contains a material toxic to gypsy moth larvae.

U.S. Pat. No. 4,666,670 discloses a potpourri holder for a ceiling fan which is a basket containing perfumed potpourri suspended beneath a ceiling fan so that air from the fan is circulated through the basket and perfumed by the potpourri. The basket has a bottom portion of relatively tightly formed mesh for retaining the potpourri and an upper portion of relatively loosely formed mesh for providing air circulation through the basket.

U.S. Pat. No. 4,455,304 discloses a composition for repelling birds, the composition having as active ingredients finely divided dried pepper from pungent fruits of plants of the genus Capsicum and finely divided dried garlic and typically being diluted by inert, finely divided mineral material or water for application to the earth surface or to growing plants to repel birds given to eating seeds, plants, vegetables, and fruits.

U.S. Pat. No. 4,169,898 discloses an animal repellant mixture of undecanone-2 and 3-phenylpropenal which is a mixture of 3-phenylpropenal with undecanone-2 acting in a synergistic manner to provide an animal repellant of improved effectiveness to discourage scavenging animals, in particular, for animals of the dog and cat families.

U.S. Pat. No. 3,755,064 discloses a water insoluble polymeric web structures and filaments containing encapsulated components. The disclosure is directed to formation of self-supporting, three dimensional, water-insoluble, polymeric web structures containing encapsulated components. The webs are composed of randomly associated joined monofilaments of water-insoluble polymers, the monofilaments ranging in average diameter from about 1 to 10 microns, usually from about 2 to 7 microns, on/or in which are located encapsulated components, e.g., coloring agents, perfumes, or other scents, e.g. insect sex attractants, agricultural chemicals, insecticides, pesticides, etc. Any water-insoluble web-forming polymer, including compatible polymer mixtures, can be used provided that the polymers are capable of having a self-supporting web structure, the randomly associated individual monofilaments of which are self-supporting when spanning a gap of at least 1 inch. The web-forming polymer solutions or dispersions can be dispensed from various types of dispensing systems and equipment, e.g. from spray guns, portable aerosol cans, etc., to provide a novel and advantageous way of dispensing agricultural treating agents or other encapsulated materials onto plants or other desired repositories or locations without interfering therewith, viz., with plant growth or metabolic processes thereof.

According to a preferred embodiment, the disclosure is also directed to aerosolizable formulations including the polymer (or polymers) forming the web structure, a solvent (or mixture of solvents) used to dissolve the polymer, a propellent (or mixture of propellants) to propel the polymer solution from the aerosol dispensing device, and the encapsulated material which becomes imbedded in or adherent to the polymeric filaments upon formation of the web. Other optional ingredients, e.g., a plasticizer(s) can be included in the aerosolizable formulations to impart increased tackiness to the web over extended time periods.

U.S. Pat. No. 3,474,176 discloses repelling animals with ketone, the method including exposing an animal to a repellent amount of at least one ketone which is (a) a saturated aliphatic ketone having from 7 to 19 carbon atoms, (b) an unsaturated aliphatic ketone having from 7 to 13 carbon atoms, or (c) 4-t-amyl cyclohexanone or 4-t-butyl cyclohexanone.

U.S. Pat. No. 3,295,246 discloses an insecticidal type coated tape including an absorbent strip saturated with a residual insecticide, the type having on its bottom face a rubber base pressure sensitive adhesive coating and resin barrier membrane between the strip and the rubber base to prevent any interaction between the residual insecticide and the rubber base of the adhesive coating.

SUMMARY OF THE INVENTION

In accordance with the present invention there is provided a cat repellant and a dispenser for the repellant. The repellant is common pepper, and the dispenser is a solid housing having a reservoir for receiving and storing the pepper and a plurality of orifices between the reservoir and the atmosphere outside the reservoir to permit the odor from the pepper to escape to the space surrounding the dispenser to repel cats.

DESCRIPTION OF THE PREFERRED EMBODIMENTS

Figure 1:
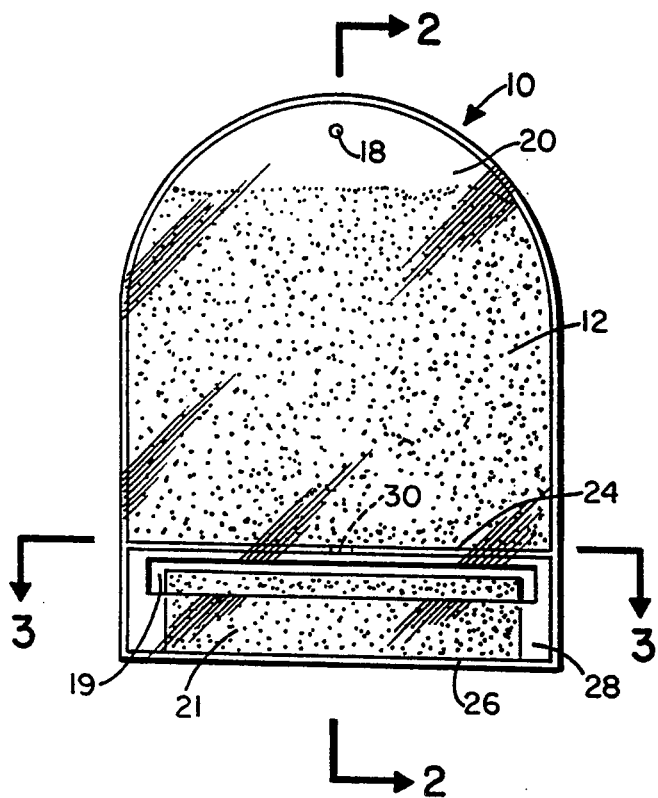
FIG. 1 is a front elevational view of a cat repellant dispenser of the present invention mounted thereon.

Referring now to the drawings, in FIGS. 1-4 is shown a cat repellant dispenser generally indicated by the numeral 10. Located inside of dispenser 10 is a solid particulate animal repellant generally indicated by the numeral 12. Preferably, to repel domestic cats, fine ground, particulate pepper commonly referred to as black or red pepper, or a mixture thereof, is used as the repellant 12. Black and red peppers release odors which are repugnant to cats and repel the cats from the area in which the pepper is found. Black and red pepper used as repellant 12 is widely distributed in food stores and groceries throughout the world to season food.

Naphthalene or camphor such as moth balls may be added to the particulate pepper to enhance the repelling qualities of the odor of repellant 12. The amount of naphthalene or camphor may be varied to achieve the desired repelling strength.

As can be seen in the drawings, dispenser 10 has a front face 14 and a rear face 16. Front face 14 preferably has an orifice 18 therein to admit air from the surrounding atmosphere through rear face 16 into repellant reservoir 20, and air vent 19 therein to enable the odor from animal repellant 12 to dissipate into the atmosphere surrounding dispenser 10 after falling onto substrate 21.

Rear face 16 is connected to front face 14 by wall 22, by reservoir bottom 24, and by dispenser bottom 26. Reservoir bottom 24 and dispenser bottom 26 form a chamber 28 into which repellant 12 falls due to gravity through orifice 30 in reservoir bottom 24 when dispenser 10 is in the upright position shown in FIGS. 1, 2, and 4.

Front face 14, rear face 16, wall 22, reservoir bottom 24, and dispenser bottom 26 are preferably made from a clear polymeric material. The plastic sheet may be any common polymeric material such as polyvinyl chloride, polystyrene, or the like.

Preferably substrate 21 is a sponge or spongy material in which the particulate repellant 12 will become imbedded after falling thereon through orifice 30. Substrate 21 and repellant 12 may be added to dispenser 10 during the construction dispenser 10 or they may be added after dispenser 10 is fully constructed by inserting sponge substrate 21 through slot 19 and by injected or pouring particulate repellant into reservoir 20 through orifice 18.

Figure 2:
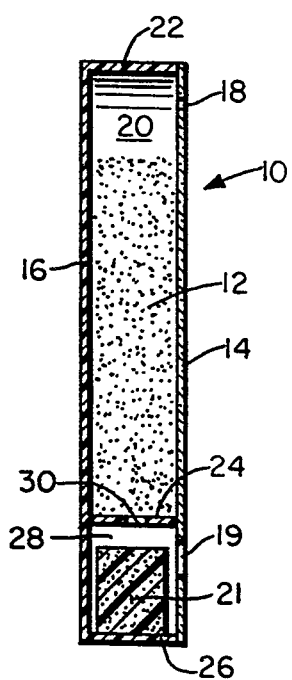
FIG. 2 is a cross-sectional view of the cat repellant dispenser of FIG. 1 taken along lines 2—2 of FIG. 1.
Figure 3:
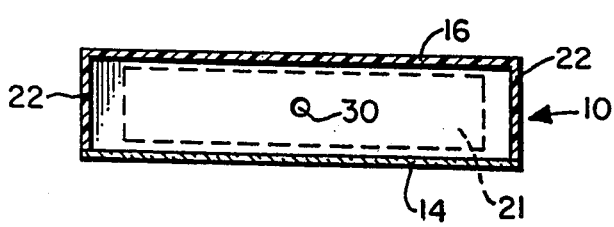
FIG. 3 is a cross-sectional view of the cat repellant dispenser of FIG. 1 taken along lines 3—3 of FIG. 1.
Figure 4:
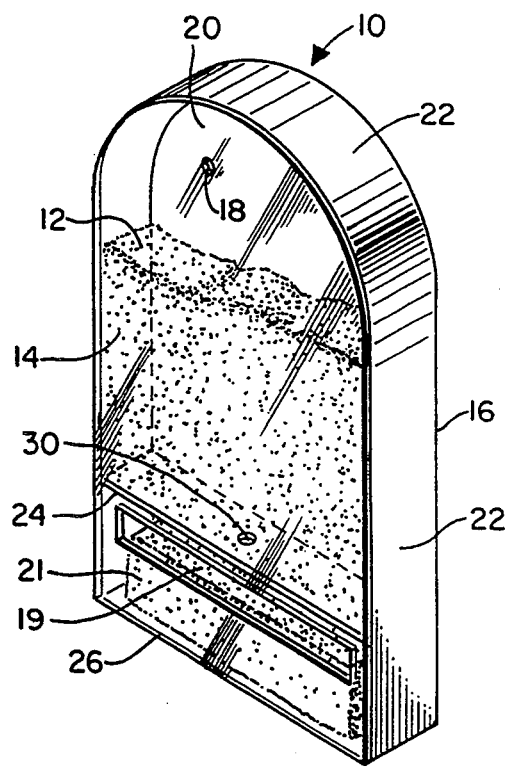
FIG. 4 is a perspective view of the cat repellant dispenser of FIG. 1.

The dispenser 10 of the invention preferably is maintained in the upright position shown in FIGS. 1, 2, and 4 while dispensing odors to repel animals such as cats. Dispenser 10 may stand on its base on the floor of a house or other building in an area in which no animals such as cats are desired. Preferably, to prevent cats from sleeping on automobile and other engines and suffering injury, the dispenser 10 is connected to the radiator shroud or other part of the engine by tying, bolting, taping, or the like. As the engine vibrates, or the automobile strikes bumps or potholes in the road particulate repellant 12 flows due to gravity and vibration through orifice 30 into chamber 28 and onto substrate 21.

Although the preferred embodiments of the invention have been described in detail above, it should be understood that the invention is in no sense limited thereby, and its scope is to be determined by that of the following claims:

What is claimed is:

1. A dispenser for dissipating odors from pepper into the atmosphere surrounding said dispenser to repel cats from the area surrounding said dispenser, said dispenser comprising:
   a. housing means having an upper end and a lower end,
   b. reservoir means located in said upper end of said housing means for holding and containing solid, particulate pepper, said reservoir means having a bottom,
   c. chamber means located in said lower end of said housing means adjacent to said reservoir means for receiving said pepper from said reservoir means, said chamber means being separated from said reservoir means by said bottom of said reservoir means, said bottom of said reservoir means having an orifice therein through which said pepper can pass to reach said chamber means, said chamber means having substrate means therein for receiving and holding said pepper received from said reservoir means, said chamber means having slot means therein for releasing odors emanating from said pepper to the atmosphere surrounding said dispenser to repel cats.

2. The dispenser of claim 1 wherein said substrate is a spongy material in which said solid, particulate cat repellant will become imbedded.

3. The dispenser of claim 2 wherein said reservoir means has orifice means therein for admitting air from the surrounding atmosphere into said reservoir means.

4. The dispenser of claim 1 wherein said pepper is black pepper.

5. The dispenser of claim 1 wherein said pepper is red pepper.

6. The dispenser of claim 1 wherein said pepper is a mixture of red and black pepper.

7. A method for repelling cats from a selected area comprising:
   a. placing a dispenser means for dissipating odors from pepper into the atmosphere surrounding said dispenser means to repel cats from the areas surrounding said dispenser means, said dispenser means comprising
      i. housing means,
      ii. reservoir means located in said housing means for holding and containing solid, particulate pepper,
      iii. chamber means located in said housing means adjacent to said reservoir means for receiving said pepper from said reservoir means by gravity flow, said chamber means having slot means therein for releasing odors emanating from said pepper to the atmosphere surrounding said dispenser to repel cats, and
   b. vibrating said dispenser to cause said pepper to flow from said reservoir means into said chamber means to release odors from said pepper to the atmosphere surrounding said dispenser means to repel cats.

8. The method of claim 7 wherein said pepper is black pepper.

9. The method of claim 7 wherein said pepper is red pepper.

10. A method for repelling cats from a selected area comprising:
   a. placing a dispenser means for dissipating odors from a mixture of solid, particulate red and black pepper into the atmosphere surrounding said dispenser means to repel cats from the areas surrounding said dispenser means, said dispenser means comprising
      i. housing means,
      ii. reservoir means located in said housing means for holding and containing said mixture of red and black pepper,
      iii. chamber means located in said housing means adjacent to said reservoir means for receiving said mixture of red and black pepper from said reservoir means by gravity flow, said chamber means having slot means therein for releasing odors emanating from said mixture of red and black pepper to the atmosphere surrounding said dispenser to repel cats, and
   b. vibrating said dispenser to cause said mixture of red and black pepper to flow from said reservoir means into said chamber means to release odors from said mixture of red and black pepper to the atmosphere surrounding said dispenser means to repel cats.

* * * * *